(12) United States Patent
Guertin

(10) Patent No.: US 6,405,514 B1
(45) Date of Patent: Jun. 18, 2002

(54) HYDRAULIC DRIVE SYSTEM FOR TURF MAINTENANCE EQUIPMENT UNIT

(75) Inventor: Richard J. Guertin, Mounds View, MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/507,311

(22) Filed: Feb. 18, 2000

(51) Int. Cl.[7] .............................................. A01D 69/03
(52) U.S. Cl. ..................... 56/10.9; 56/14.7; 56/DIG. 11
(58) Field of Search ................................. 56/10.8, 10.9, 56/14.7, DIG. 11; 180/308; 701/71, 82, 83; 60/426

(56) References Cited

U.S. PATENT DOCUMENTS

| | | | | |
|---|---|---|---|---|
| 3,736,732 A | * | 6/1973 | Jennings et al. ............. 56/10.9 |
| 4,140,196 A | * | 2/1979 | Brewer ........................ 56/10.9 |
| 4,396,087 A | * | 8/1983 | Rock et al. .................. 180/308 |
| 5,533,325 A | * | 7/1996 | Sallstrom et al. ................. 56/7 |
| 5,915,496 A | * | 6/1999 | Bednar et al. .............. 180/305 |
| 6,073,716 A | * | 6/2000 | Ellertson et al. ............ 180/197 |
| 6,176,084 B1 | * | 1/2001 | Ehn, Jr. ........................ 60/427 |
| 6,189,641 B1 | * | 2/2001 | Azuma ........................ 180/242 |

* cited by examiner

*Primary Examiner*—Robert E. Pezzuto
*Assistant Examiner*—Nathan Mammen
(74) *Attorney, Agent, or Firm*—James W. Miller

(57) ABSTRACT

A turf maintenance equipment unit, such as a riding mower having two side cutting units and a front cutting unit operatively connected to a traction frame. A hydraulic traction system is provided for propelling the traction frame in forward and reverse. This traction system includes a pair of front drive motors and a rear drive motor connected in parallel to a pump. A pressure reducing device limits fluid pressure to the rear drive motor when the traction frame is moving in reverse to increase the climbing ability of the traction frame in reverse.

14 Claims, 3 Drawing Sheets

HYDRAULIC DRIVE SYSTEM FOR TURF MAINTENANCE EQUIPMENT UNIT

TECHNICAL FIELD

This invention relates to a hydraulic drive system for a self-propelled turf maintenance equipment unit, such as a riding mower. More particularly, this invention relates to a hydraulic drive system which maximizes the ability of the turf maintenance equipment unit to climb slopes in both forward and reverse.

BACKGROUND OF THE INVENTION

This invention relates to turf maintenance equipment generally. Riding mowers comprise one type of mower to which this invention relates. Thus, this invention will be explained in the context of riding mowers, but is not limited for use with riding mowers.

Riding mowers are known for use on golf courses and the like for mowing a relatively wide cutting swath, i.e. a cutting swath in the 8' to 12' range. Such mowers have a traction frame that is self-propelled by a suitable power source, such as an internal combustion engine, carried on the traction frame. A seated operator is also carried on the traction frame for steering and operating the mower.

Mowers of this type often have multiple cutting units attached to the traction frame. Typically, these cutting units include a front cutting unit and two side cutting units. The cutting units can be either reel-type cutting units or rotary cutting units.

When rotary cutting units are used on the mower, each cutting unit often includes at least two cutting blades rotatably mounted thereon. It is the combination of multiple cutting units, each having multiple cutting blades, that allows a very wide cutting swath to be cut by a rotary mower.

The traction frame often includes a hydraulic traction system having a source of pressurized fluid comprised of one or more hydraulic pumps powered by the engine. The fluid source supplies pressurized fluid to hydraulic drive motors. Certain of these drive motors are operatively connected to at least some of the ground engaging wheels of the traction frame. Other of these drive motors are used to power the cutting units.

Mowers of this type are used on golf courses or similar turf areas, such as parks, which have many slopes. The mower needs to climb such slopes both in forward and reverse. However, previously known hydraulic drive systems did not maximize the ability of the mower to climb slopes in both directions. A mower typically would have good climbing ability when moving up the slope in the forward direction. The same mower would have poor climbing ability when attempting to back up the same slope. This is obviously a disadvantage.

SUMMARY OF THE INVENTION

One aspect of this invention relates to a turf maintenance equipment unit which comprises a traction frame capable of movement over the ground. At least one turf maintenance operating unit is coupled to the frame. A hydraulic traction system is provided for powering the traction frame. The traction system comprises a source of pressurized fluid. At least one front drive motor powers at least one front drive wheel on the traction frame. At least one rear drive motor powers at least one rear drive wheel on the traction frame. The front and rear drive motors are connected in parallel to the source of pressurized fluid. A pressure reducing device is provided for supplying the at least one rear drive motor with fluid at different maximum pressures during forward and reverse motions of the traction frame.

Another aspect of this invention relates to a turf maintenance equipment unit which comprises a traction frame capable of movement over the ground. The traction frame has a pair of front drive wheels and at least one rear drive wheel. At least one turf maintenance operating unit is coupled to the frame. A hydraulic traction system is provided for powering the traction frame. The traction system comprises a source of pressurized fluid. At least one front drive motor powers at least one front drive wheel on the traction frame. At least one rear drive motor powers at least one rear drive wheel on the traction frame. The front and rear drive motors are connected in parallel to the source of pressurized fluid. A check valve and pressure reducing device are placed in a fluid path to the at least one rear drive motor and are arranged so that in one direction of motion of the traction frame the fluid leaving the at least one rear drive motor bypasses the pressure reducing device through the check valve and in an opposite direction of motion of the traction frame the fluid entering the at least one rear drive motor is checked by the check valve and passes through the pressure reducing device before entering the at least one rear drive motor.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
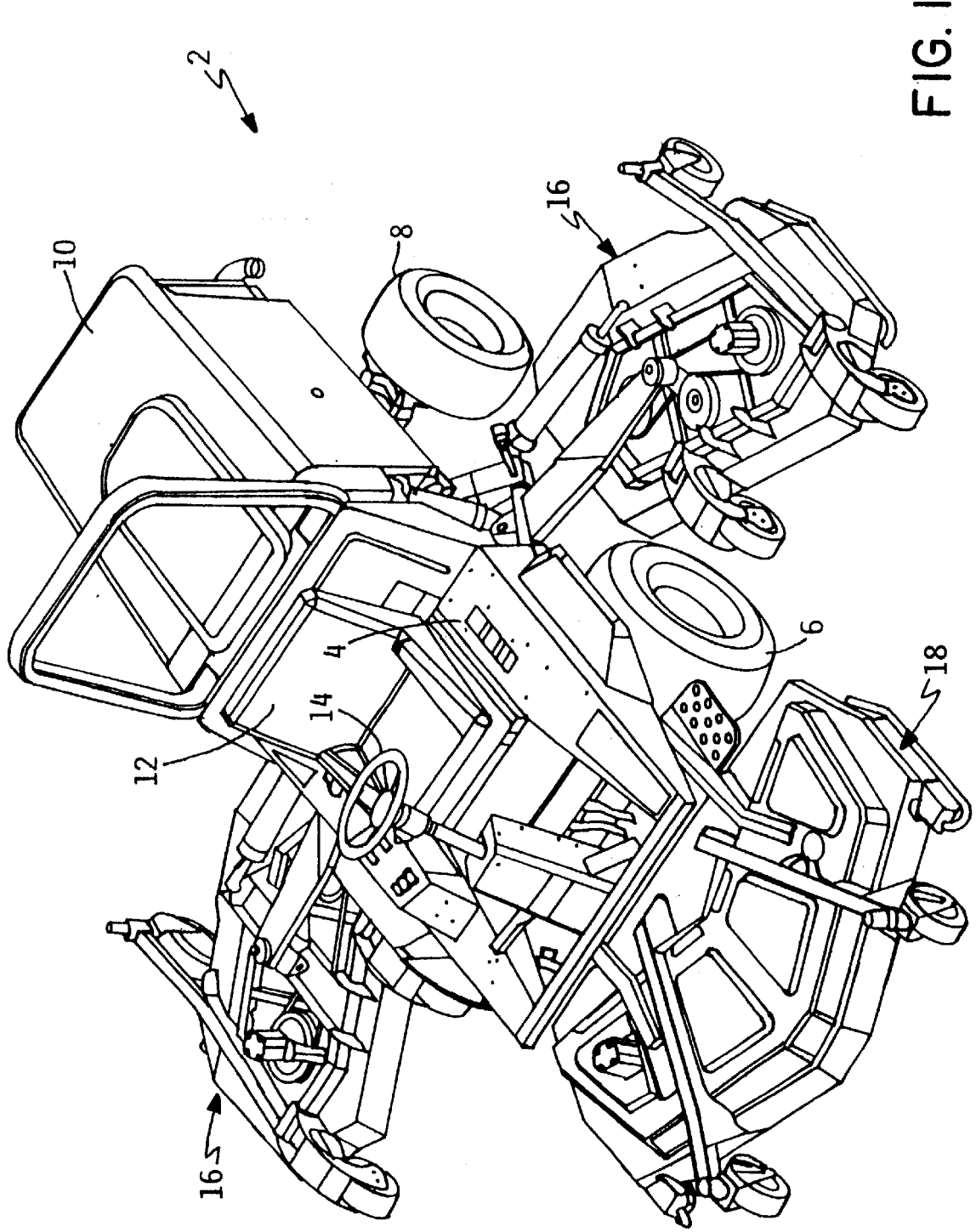
FIG. 1 is a perspective view of one embodiment of a turf maintenance equipment unit according to this invention comprising a mower having a single front cutting unit and two side cutting units, with the belt covers for the side cutting units removed.

This invention relates to a turf maintenance equipment unit such as a riding mower illustrated generally as 2. Referring to FIG. 1, mower 2 includes a traction frame 4 that is supported for motion over the ground by a pair of front wheels 6 and a pair of rear wheels 8. Traction frame 4 carries a power source (not shown), such as an internal combustion or diesel engine or the like, which is mounted at the rear of traction frame 4 and is enclosed by a hood or shroud 10. Traction frame 4 also carries an operator's seat 12 for carrying an operator. A steering wheel 14 adjacent seat 12 allows the operator to steer and guide mower 2 while it is operating.

A hydraulic system is carried on traction frame 4 which includes a source of pressurized fluid, such as an engine operated hydraulic pump 20. Pump 20 powers the traction system for propelling traction frame 4 in forward and reverse. Various hydraulic motors 22 and 24 are provided on traction frame 4 which utilize the pressurized fluid from pump 20 for propelling traction frame 4. Other hydraulic pumps and motors can be provided for operating other components on mower 2, such as side cutting units 16 and front cutting unit 18.

Traction frame 4 is propelled in forward and reverse by a hydraulic traction system comprising two front hydraulic drive motors 22 and a rear hydraulic drive motor 24. The two front hydraulic drive motors 22 are operatively connected to the two front wheels 6 of traction frame 4 such that one drive motor 22 drives each front wheel 6. The rear hydraulic drive motor 24 drives the two rear wheels 8 of traction frame 4 through a mechanical transaxle (not shown) of any suitable design. Thus, in the embodiment of traction frame 4 disclosed herein, all four wheels 6 and 8 of traction frame 4 are positively driven by the hydraulic traction system. If so desired, the two rear drive wheels 8 could be replaced by a single drive wheel 8 with the rear hydraulic drive motor 24 driving such single drive wheel 8.

Front drive motors 22 can be coupled to front wheels through a planetary gearbox (not shown) or the like providing a drive reduction. The transaxle which couples rear drive motor 24 to rear wheels 8 also provides a drive reduction. In one embodiment of a traction frame 4 according to this invention, front motors 22 each have a displacement of 2.48 and a drive reduction of 5.2. Rear motor 24 has a displacement of 2.01 and a drive reduction of 12.6.

Figure 2:
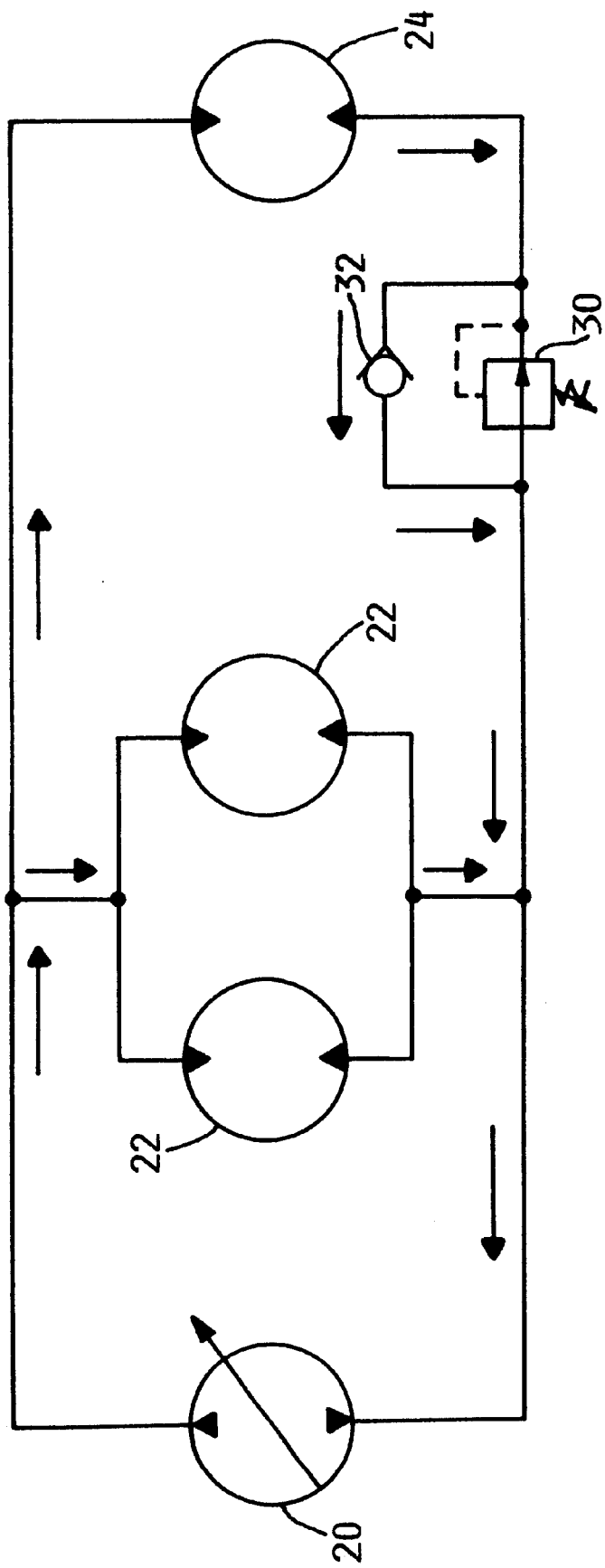
FIG. 2 is a schematic view of a hydraulic drive system according to this invention used in conjunction with the mower shown in FIG. 1, particularly showing flow through the drive system during forward movement of the mower.
Figure 3:
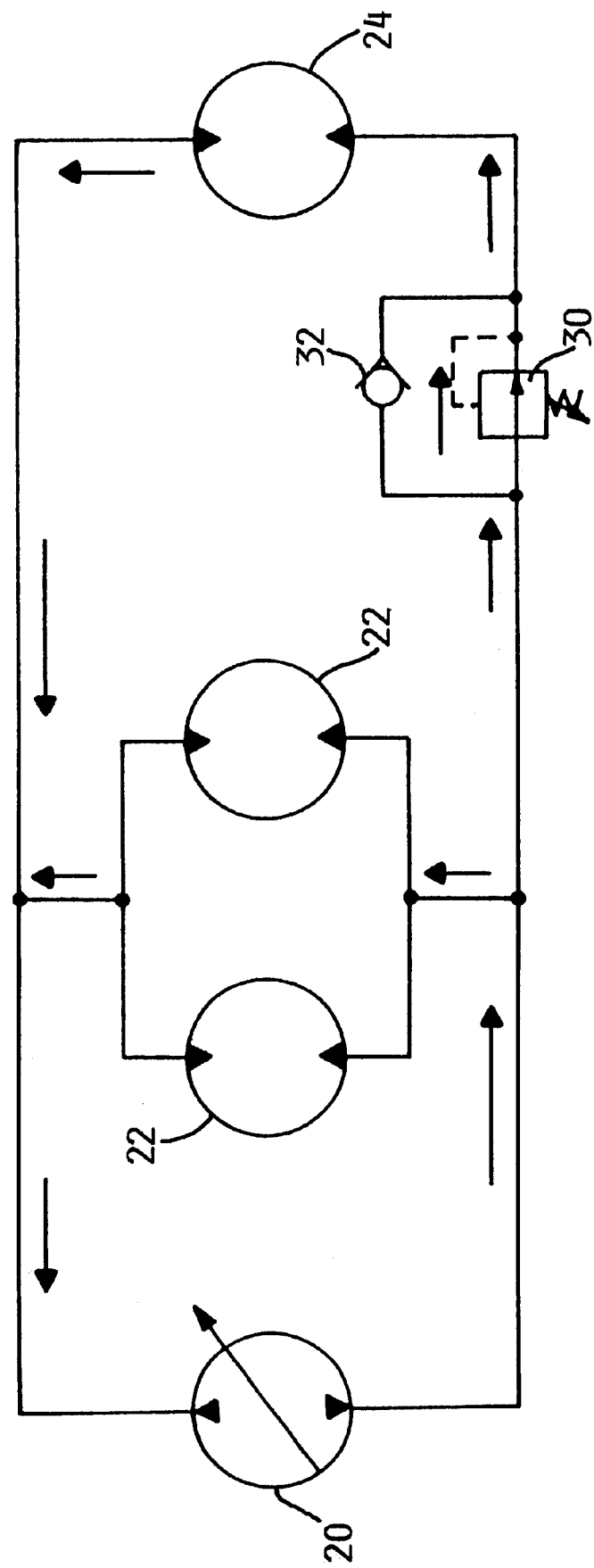
FIG. 3 is a schematic view of a hydraulic drive system according to this invention used in conjunction with the mower shown in FIG. 1, particularly showing flow through the drive system during reverse movement of the mower.

As shown in FIGS. 2 and 3, the three hydraulic drive motors 22, 22 and 24 for the traction system are all connected in parallel to pump 20. Pump 20, motors 22 and 24, and the drive reduction ratios of motors 22 and 24 are all sized so that the climbing ability of traction frame 4 with respect to the forward direction of travel of traction frame 4 is maximized. In other words, the pressure available to motors 22 and 24 is sufficient so that the combined tractive effort available from the front and rear drive wheels 6 and 8 meets or exceeds that required to keep the traction frame climbing at slopes up to approximately 30°. The arrows in FIG. 2 show the fluid flow through the traction system during motion of traction frame 4 in the forward direction.

A traction system that is maximized for climbing with respect to the forward direction of travel has poor performance when climbing in the reverse direction of travel. This is due to the weight transfer that occurs when the slope of the slope increases. The weight of traction frame 4 gradually transfers to the downhill drive wheels as the slope of the slope increases. Thus, when a traction frame 4 travels in a forward direction up a slope, the weight transfers off the front wheels 6 and onto rear wheels 8. The amount of this weight transfer increases with the degree of the slope. Thus, the traction system is designed to take this into account by insuring that rear drive motor 24 receives sufficient pressure in the forward direction of travel to take advantage of the weight transferred to rear wheel 8 when traction frame 4 climbs a slope in the forward direction.

However, the opposite happens when traction frame 4 attempts to back up a slope in the reverse direction. In this scenario, rear wheels 8 are the uphill wheels and such rear wheels 8 progressively lose weight, and thus tractive effort, to front wheels 6 as the degree of the slope increases. If the same amount of fluid pressure is supplied to rear drive motor 24 in this situation as when traction frame 4 is climbing in the forward direction of travel, much of the fluid pressure supplied to rear drive motor 24 is wasted because of the progressive weight transfer off rear wheels 8. Thus, traction frame 4 cannot climb up slopes in reverse nearly as well as in forward.

To improve the climbing ability of traction frame 4 in reverse, a pressure reducing valve 30 and check valve 32 are installed in what is the return fluid line (when traction frame 4 travels forwardly) from rear drive motor 24. Referring to FIG. 2, when traction frame 4 travels forwardly, fluid leaving rear drive motor 24 can bypass around pressure reducing valve 30 through check valve 32. However, when traction frame 4 travels rearwardly, fluid flow in the parallel circuit to drive motors 22 and 24 is reversed so that incoming flow is present in the return line from rear drive motor 24. In this situation, check valve 32 remains closed and pressure reducing valve 30 lets flow through to rear drive motor 24, but at a reduced pressure. FIG. 3 shows the fluid flow through the traction system during motion of traction frame 4 in the reverse direction.

During forward motion of traction frame 4, fluid is supplied to rear drive motor 24 at pressures which are the same as those to the front motor, which pressures vary with demand to a maximum pressure set by a fluid relief valve (not shown). This maximum fluid pressure may be approximately 3,500 psi. However, during rearward motion of traction frame 4, pressure reducing valve 30 limits the maximum fluid pressure to rear drive motor to approximately 650 psi. Thus, during rearward motion of traction frame 4, the maximum fluid pressure to rear drive motor 24 is set to be much less than the maximum fluid pressure delivered to front drive motors 22.

Thus, the fluid flow characteristics of the traction system are changed depending upon whether traction frame 4 moves forwardly or in reverse. In reverse motion of traction frame 4, less maximum fluid pressure is available to rear drive motor 24, and hence more fluid pressure is necessarily available to front drive motors 22, than in forward motion of traction frame 4.

One could obviously design a hydraulic traction system whose climbing ability was maximized for reverse motion up a slope. In this case, the traction system would have relatively poor climbing ability when moving forwardly up the slope. In this case, the position of check valve 32 and pressure reducing valve 30 would be reversed with such check valve 32 and pressure reducing valve 30 being placed in the input line leading to rear drive motor 24 such that pressure reducing valve 30 would limit pressure to rear drive motor 24 during forward motion of traction frame 4 and check valve 32 would open during reverse motion of traction frame 4 to permit fluid to bypass pressure reducing valve 30.

Various modifications of this invention will be apparent to those skilled in the art. For example, the pair of front drive motors 22 could be replaced by a single front drive motor 22 driving the front wheels 6 through a mechanical transaxle. Pressure reducing valve 30 could be any other device that can reduce pressure in a hydraulic flow path. In addition, the hydraulic drive system of this invention can be applied to turf maintenance equipment units other than mowers which carry turf maintenance operating units other than cutting units, such as sand trap rakes, grooming, thatching or rolling implements, etc. Thus, the scope of the invention shall be limited only by the appended claims.

I claim:

1. A turf maintenance equipment unit, which comprises:
   (a) a traction frame capable of movement over the ground;
   (b) at least one turf maintenance operating unit coupled to the frame;
   (c) a hydraulic traction system for powering the traction frame, the traction system comprising a source of pressurized fluid, at least one front drive motor powering at least one front drive wheel on the traction frame, and at least one rear drive motor powering at least one rear drive wheel on the traction frame, the front and rear drive motors being connected in parallel to the source of pressurized fluid by a fluid path that provides full pump flow to the front and rear drive motors in both forward and reverse directions; and (d) a pressure reducing device for supplying the at least one rear drive motor with full pump flow at different maximum pressures during forward and reverse motions of the traction frame.

2. The turf maintenance equipment unit of claim 1, wherein the pressure reducing device comprises a pressure reducing valve which supplies a maximum fluid pressure to the at least one rear drive motor during reverse motion of the traction frame which is less than the maximum fluid pressure supplied to the at least one rear drive motor during forward motion of the traction frame.

3. The turf maintenance equipment unit of claim 2, wherein only one rear drive motor is provided.

4. The turf maintenance equipment unit of claim 3, wherein the one rear drive motor is operatively coupled to a pair of rear drive wheels to drive the pair of rear drive wheels.

5. The turf maintenance equipment unit of claim 3, wherein a pair of front drive motors is provided.

6. The turf maintenance equipment unit of claim 5, wherein a pair of front wheels is provided and each front drive motor powers one front wheel.

7. The turf maintenance equipment unit of claim 1, wherein the turf maintenance equipment unit comprises a mower, the turf maintenance operating unit comprises a cutting unit.

8. The turf maintenance equipment unit of claim 7, wherein the cutting unit comprises a rotary cutting unit.

9. A turf maintenance equipment unit, which comprises:

(a) a traction frame capable of movement over the ground, the traction frame having a pair of front drive wheels and at least one rear drive wheel;

(b) at least one turf maintenance operating unit coupled to the frame;

(c) a hydraulic traction system for powering the traction frame, the traction system comprising a source of pressurized fluid, at least one front drive motor powering at least one front drive wheel on the traction frame, and a single rear drive motor powering at least one rear drive wheel on the traction frame, the front and rear drive motors being connected in parallel to the source of pressurized fluid by a fluid path that provides fluid at a predetermined maximum pressure to the front and rear drive motors during forward motion of the traction frame such that the fluid is available at the predetermined maximum pressure to all of the front and rear drive motors during forward motion of the traction frame, the fluid path including fluid supply lines which transport fluid from the source of pressurized fluid to the front and rear drive motors and fluid return lines which return fluid from the front and rear drive motors to the source of pressurized fluid during forward motion of the traction frame; and (d) a single check valve and pressure reducing device placed in the return line from the rear drive motor and arranged to supply only the rear drive motor with fluid at less than the predetermined maximum pressure during reverse motion of the traction frame while the fluid path continues to supply the at least one front drive motor with fluid at the predetermined maximum pressure during reverse motion of the traction frame.

10. The turf maintenance equipment unit of claim 9, wherein the turf maintenance equipment unit comprises a mower, the turf maintenance operating unit comprises a cutting unit.

11. The turf maintenance equipment unit of claim 10, wherein the cutting unit comprises a rotary cutting unit.

12. The turf maintenance equipment unit of claim 9, wherein a pair of front drive motors are provided each of which is operatively coupled to one of the front drive wheels for powering the front drive wheels on the traction frame.

13. The turf maintenance equipment unit of claim 9, wherein the rear drive motor is operatively coupled to a pair of rear drive wheels to drive the pair of rear drive wheels.

14. The turf maintenance equipment unit of claim 9, wherein the pressure reducing device comprises a pressure reducing valve.

* * * * *